INVENTORS
LEONARD E. MALIN &
WARREN B. WATKINS
BY
ATTORNEY

United States Patent Office 3,062,223
Patented Nov. 6, 1962

3,062,223
APPARATUS FOR CONTROLLING PICKLING BATHS
Leonard E. Malin, 15150 Hastings Drive, Dolton, Ill., and Warren B. Watkins, 8244 Monroe St., Munster, Ind.
Filed Feb. 15, 1962, Ser. No. 174,365
2 Claims. (Cl. 134—57)

This invention relates to chemical treatment of solid objects and is particularly directed to an apparatus for controlling the volume, composition and temperature of a liquid treating bath while the objects to be treated are successively immersed in and removed from it or, especially in the case of elongated flexible ones, passed continuously through it, as in the continuous pickling of ferrous metal strip and the like.

As brought out in Mancke et al. U.S. Patent 2,927,871, granted March 8, 1960, manual control of the several variables affecting the chemical action of a pickling bath involves time-consuming tests the results of which may not become available until after one or more of several conditions tending in undesirable directions have so far progressed in such directions as to produce unacceptable chemical action on the objects being treated and attempts have been made to devise automatic controls which, although perhaps not capable of anticipating departures from optimum conditions, are at least designed to respond relatively promptly thereto by initiating corrective measures before serious harm has been done, and the method disclosed and claimed in that patent represents a step in the progress of the art toward the provision of such controls. In accordance with the said patent, however, several factors which substantially affect the results attained are relatively uncontrolled or relatively primitive and inadequate provision is made for their control with the result conditions in the bath may fluctuate widely leading to erratic and non-uniform chemical action, waste of chemical components and need for substantially constant supervision of the operation even of instrumentalities designed to be entirely automatic.

It is therefore a principal object of this invention to provide apparatus for controlling operating conditions in a chemical bath automatically with automatic compensation for the effect of changes in one condition upon other related conditions.

Another object is to provide apparatus which affords control of the several factors influencing a chemical treatment in such manner as to maintain each of said factors at optimum value within relatively small tolerances whereby maximum usefulness of the chemical reagents supplied is realized and substantially uniform results of highest quality are attained.

Figure 1:
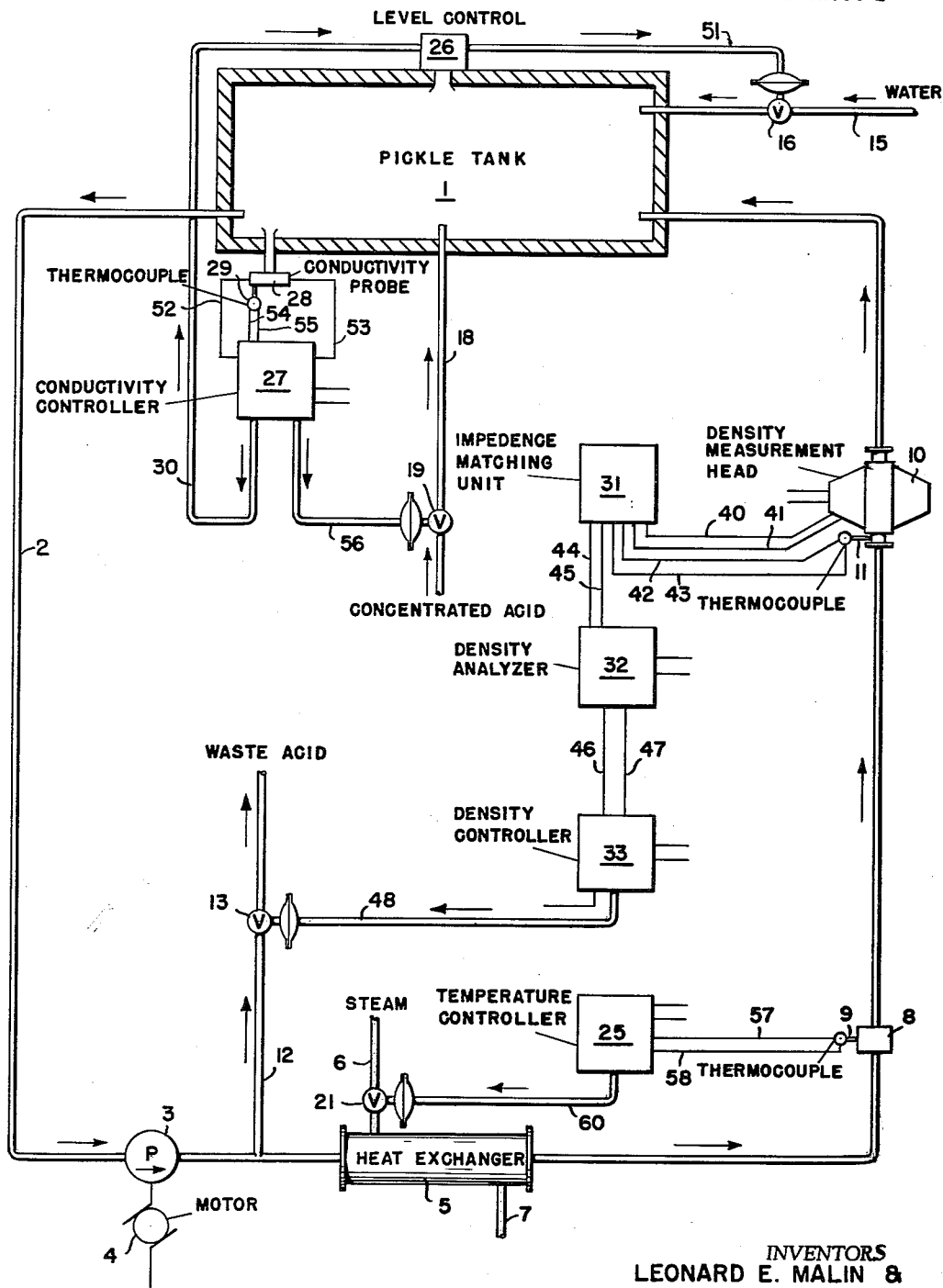
Figure 2:
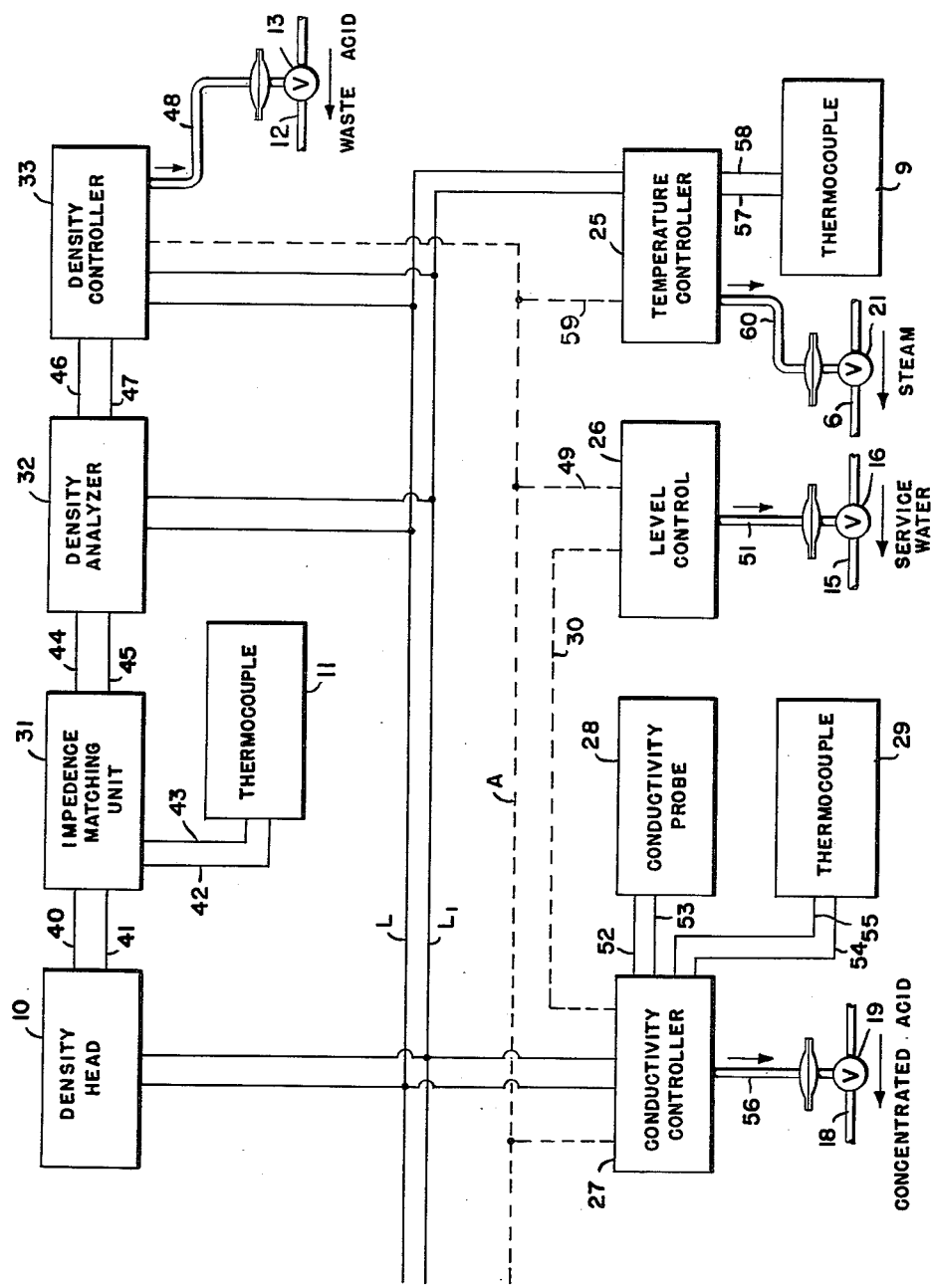

Other objects, purposes and advantages of the invention will hereinafter more fully appear or will be understood from the following description of its practice in connection with our novel apparatus diagrammatically illustrated in the accompanying drawings in which:

FIG. 1 is a schematic diagram showing the physical relationship in relation to the liquid of a chemical treating bath of the several instrumentalities which by their combined operation provide precise control of the conditions in the bath as they relate to chemical composition, temperature and volume, while FIG. 2 is a schematic diagram of the several energy circuits utilized for actuating and giving effect to the operations of the several instrumentalities represented in FIG. 1.

As the invention is perhaps of primary utility in connection with a pickling bath for ferrous metal products such as iron or steel coils, rods, strips or the like the following disclosure, without being limited thereto, will be directed particularly to that field.

In a pickling bath for ferrous articles the chemically active agent is usually sulfuric acid ($H_2SO_4$) which reacting with the iron oxide mill scale and other contaminants on the surface of the article being pickled produces primarily ferrous sulfate ($FeSO_4$) in solution in the bath liquor and, all other factors remaining the same, increases the density of the latter in proportion to the ferrous sulfate concentration. The accompanying decomposition of sulfuric acid moreover decreases the concentration of acid in the liquor and thus modifies the electrical conductivity of the latter and instrumentalities for detecting changes of such character are utilized in accordance with the invention for discharging or bleeding away some of the liquor when an excess of ferrous sulfate is present and for supplying fresh concentrated sulfuric acid when the concentration of that component falls below a predetermined value.

In addition to these factors the bath temperature and its total volume must be maintained as nearly constant as practical for best results and the invention contemplates supplying heat to the bath when needed to compensate for losses through radiation, discharge of hot liquor containing excess ferrous sulfate and its replacement by relatively cold fresh acid and/or water, or other cause, and automatically introducing water into the bath when loss in volume from any cause is not compensated for by acid introduced to maintain concentration.

The interrelation between these several factors which for best results must be regulated within small tolerances is such that the instrumentalities utilized for controlling them cannot function effectively except under the influences of factors affecting others thereof and for this reason an aggregative introduction of instrumentalities, each acting independently in response to a change of a given condition or factor is ineffective to attain optimum results. Thus while, as indicated, an increase of ferrous sulfate in the bath liquor causes a rise in its density, all other factors being equal, a somewhat comparable density increase occurs on lowering of its temperature and it is therefore wasteful to bleed off or discharge some of the liquor because of increasing density, without regard to the bath temperature. Similarly, when due to such bleeding off, evaporation or other causes the total volume of the bath declines more liquid must be supplied to restore it to original volume, but as it is inconvenient to maintain a supply of sulfuric acid of precisely the correct concentraton required under any given condition to restore the bath volume without affecting the concentration of acid in it and the addition of concentrated acid affects the acid concentration and the total volume of the bath, the admission of water must be related not only to the bath volume but to the admission of acid as well.

The conductivity of the liquor is also affected by temperature and thus cannot be utilized alone to afford an index of acid concentration and for correct operation of the instrumentalities controlling the introduction to the bath of concentrated acid it is advisable the temperature controlling instrumentalities maintain the bath at constant temperature within very narrow limits although temperature compensation is provided for the conductivity responsive instrument controlling the admission of fresh acid as well as for that responsive to changes in the liquor density.

Moreover composition as well as temperature should for best results be as nearly uniform as possible throughout the entire mass of liquor, since if a localized body of it having for example an inappropriate acid concentration should be permitted to influence the conductivity sensing unit acid needed to bring the average acid concentration in the mass to the optimum value might be withheld, or unneeded acid supplied, which cannot occur when the composition and temperature of the mass are uniform throughout.

Our invention therefore contemplates a continuous relatively high volume flow of liquor into and from the pickle tank with certain of the instruments utilized for sensing conditions in the liquor as well as some effective for taking measures to correct departures from optimum conditions disposed and arranged to influence the liquor during its circulation in a normally closed system outside the tank rather than in the tank itself, such circulation moreover being effective to keep the liquor in the tank constantly in motion whereby its optimum effect in uniformly acing upon the articles being pickled is realized. The sensing instruments, or those responsive thereto, may embody recording mechanisms if desired but as this is a matter of choice not affecting their primary functions no further reference to the making or preservation of records of their operation is herein required.

Referring now more particularly to the drawings we shall first describe the several instrumentalities utilized in our apparatus from the standpoint of the responses of some of them to conditions present in the pickle liquor and their several effects upon other instrumentalities operative to alter such conditions all with particular reference to FIG. 1, and shall thereafter with reference to FIG. 2 explain the flow of actuating energy to and from the said instrumentalities to enable those skilled in the art more readily to construction an operative apparatus, but without excluding utilization therein of energy in different principles to fluctuations of conditions in the bath.

Thus in FIG. 1 there is represented a pickle tank 1 which may be one of a series of similar ones if a succession of tanks for continuous pickling of elongated ferrous metal strip or the like is employed, but as each tank in such series is desirably provided with a system of controls and associated instrumentalities independent of that of all other tanks a description of but one of them herein will suffice.

Connected to tank 1, preferably at its opposite ends, is a closed circuit circulating conduit 2 with arrows indicating the direction of flow of pickle liquor through it; for maintaining the liquor flow a recirculation pump 3 driven by a motor 4 or other prime mover is interposed in conduit 2 and the liquor normally passes therefrom through a heat exchanger 5 provided with steam inlet and exhaust conduits 6, 7 or other suitable heating means, thence through a vessel 8 housing a thermocouple 9 sensitive to the liquor temperature, next through a density measurement head 10 including a thermocouple 11 sensitive, like thermocouple 9, to the liquor temperature, and returns to tank 1 through the remaining length of conduit which to prevent heat losses throughout its length may be provided with heat insulating pipe covering (not shown) of any appropriate character.

At a suitable point in conduit 2, preferably as shown between pump 3 and heat exchanger 5, a branch conduit 12 is connected through a regulator valve 13 to a discharge receptacle (not shown) in which spent pickle liquor may be collected for appropriate disposition, while a supplementary conduit 15 is connected to tank 1 to supply fresh water under the control of a regulator valve 16.

Also discharging into the tank at a convenient location is a fresh acid supply pipe 18 through which concentrated acid may be admitted to the tank under the control of a regulator valve 19.

A fourth regulator valve 21 is interposed in steam inlet conduit 6 supplying steam to heat exchanger 5; these several valves 13, 16, 19 and 21, while indicated as pneumatically operable, are of course intended merely as exemplary of valves which may be utilized to control, in response to signals received from other instruments, the flow of the several fluids passing through the conduits in which they are situated, and electrical hydraulic or otherwise operated valves not requiring manual actuation may be substituted therefor if desired.

The control mechanisms we prefer to employ for the several valves just mentioned include a temperature controller 25 of any appropriate type responsive to electrical signals received from thermocouple 9 and effective to deliver in accordance therewith compressed air to steam valve 21 for introducing steam to or withholding it from heat exchanger 5 as needed to maintain the liquor flowing through the conduit at optimum temperature.

In like manner air is used to operate the incoming water valve 16 from a level controlled 26 responsive to fluctuations in the level of the liquor in tank 1 although its operation, as will hereinafter more fully appear, is subject to interruption, or bing "locked out" by the action of a conductivity controller 27 the primary function of which is to actuate valve 19 for admitting concentrated acid to tank 1.

Controller 27 which may be of any suitable type such as the Speedomax Recording Controller for Pneumatic Control, Conductivity Control—Type "G", Catalog No. 53514–H1–A5–P2, marketed by Leeds & Northrup Co., Philadelphia 44, Pa., receives its directing signals from a conductivity sensing probe 28 provided with a temperature compensation thermocouple 29; this probe may be of any suitable character, for example, one including a conductivity cell having a pair of electrodes exposed to contact with the liquor in tank 1 as in the system described in said Mancke patent for energizing a concentrated sulfuric acid supply valve controller. In accordance with our invention, however, controller 27 instead of, as in Mancke, merely effecting introduction of concentrated acid to tank 1 also controls, preferably through a pneumatic connection 30, level controller 26 whereby the latter is locked out in response to a lowered fluid level in the tank when the conductivity probe 28 detects an acid concentration in the liquor below the value at which its signal induces conductivity controller 27 to act to open valve 19 for admission of fresh concentrated acid. In this manner the maintenance of proper volume as well as acid concentration is accomplished without waste of acid or risk of overfilling the tank.

The mechanism employed for actuating bleed valve 13 for discharging to waste an appropriate quantity of the pickle liquor when the density measurement head 10 detects an inappropriate increase in its density includes an impedance matching unit 31 connected to the head and to thermocouple 11 whereby its responses to the head signals may be modified by those from the thermocouple to render ineffective those from the former which reflect low temperature of the liquor rather than a too high concentration of ferrous sulfate in it. Head 10 itself may be one comprising a radiation source and an ionization chamber disposed in opposed relation to a radiation permeable enclosure through which the liquor in pipe 2 passes, whereby a signal is produced varying in accordance with changes of the quantity of gamma rays reaching the ionization chamber through the liquor from the radiation source and electrically amplified for transmission to the impedance matching unit 31 where the signal is matched with one received from thermocouple 11 and forwarded to a density composition analyzer 32 of any suitable type such as that being marketed by Industrial Neucleonics Corporation, 650 Ackerman Road, Columbus 14, Ohio. This instrument in turn transmits a signal to a density controller 33 which includes a valve for delivering air under pressure to valve 13 to actuate it and thus discharge a quantity of liquor from the system, the volume represented by the thus discharged liquor being quickly compensated for by introduction of fresh acid and water to tank 1 in the manner already described.

While in FIG. 1 we have illustrated schematically the several instrumentalities, conduits and the like incorporated in our system and have indicated their several relationships with respect to the pickle tank and its circulating supply of pickle liquor, we have not attempted to show in detail the means by which energy for their actuation is distributed among them. In FIG. 2, on the other hand, we have diagrammed a simplified schematic arrangement of electrical and pneumatic circuits which may be utilized for actuating and controlling the valves through which, respectively, water and acid are admitted to the pickling tank, steam is admitted to the heat exchanger and waste pickle liquor is discharged from the system without, however, attempting to illustrate therein the physical relationship of any of said valves to any other element of the apparatus. Furthermore, while we have indicated electrical connections to a power supply suggesting provision of a single phase electrical circuit and broken lines representing conduits for compressed air we do not thereby exclude use of a 3-phase or any other suitable electrical system or a 2-way pneumatic circuit in which pressure and return conduits are employed, although we prefer to use pneumatically operated valves of a self closing type opening in response to air pressure in the conduits connected with them and closing automatically when such pressure is relieved.

Thus electrical energy from a suitable source is supplied to the system through principal lead-in conductors L, $L_1$ to which density head 10, density composition analyzer 32, density controller 33, temperature controller 25 and conductivity controller 27 are directly, and independently, connected by suitable conductors readily identifiable in FIG. 2.

The impedance matching unit 31 receives signals from the density head 10 through conductors 40, 41 and modifying signals through conductors 42, 43 from temperature compensation thermocouple 11 the unit in turn supplying signals through conductors 44, 45 to density composition analyzer 32 which, while directly connected to power supply conductors L, $L_1$ in turn delivers its signals electrically through conductors 46, 47 to density controller 33, the latter also connected to L, $L_1$ and through its connection with the pneumatic supply A as well as supplying compressed air through a conduit 48 for actuating waste acid control valve 13.

Density controller 33 like conductivity controller 27 and temperature controller 25 is thus connected to the primary air supply conduit A as well as to power lines L, $L_1$ while the level control 26 has an energy source represented by a connection 49 with the air supply. Air conduit 30, however, connects it with conductivity controller 27 supplying signals which under certain circumstances as heretofore explained interrupt or inhibit action by it directed to opening water valve 16; thus the conductivity controller 27, in addition to controlling directly acid valve 18, also indirectly through level control 26 sometimes in effect controls water valve 16 as well. The conductivity controller receives electrical signals through conductors 52, 53 from the conductivity probe 28 having a self-contained energy source while the signals it receives through conductors 54, 55 from temperature compensation thermocouple 29 are of course of thermoelectric origin; it controls acid valve 19 through an air conduit 56.

Signals of like character are conveyed over conductors 57, 58 from thermocouple 9 to temperature controller 25 whereby in response thereto it delivers air under pressure supplied to it through a branch 59 of conduit A by way of a conduit 60 to steam control valve 21 for regulating the supply of steam to heat exchanger 5.

Thus a plurality of instrumentalities directly control respectively the passage of fluids through independent valves but in accordance with our invention the action of each is affected in some way by the consequences of action by at least one of the others and each therefore is in some part dependent on others in the cooperative attainment of an overall control of the pickling bath.

This control is exercised, moreover, in such manner that the interdependence of the several steps which modify existing conditions is recognized and utilized to minimize over-compensation for a change in a condition which may have more than one cause. Thus the acid concentration in the liquor may decrease because of decomposition of acid in reaction with scale on the articles being pickled, or as a result of introduction of water to restore normal level of the liquor in the tank to compensate for evaporation losses or discharge of spent liquor due to excess density. However when such concentration decrease is detected admission of water to the tank is suspended until sufficient acid has been introduced to restore normal acid concentration, and it is only after it has been restored that water, if needed, can be admitted to bring the liquid in the tank to normal level. Hence if a large discharge of liquor should occur resulting in the water admitted for restoring the tank level so diluting the liquor as to require more acid before normal level has been attained admission of acid, with interruption of the addition of water, ensues, and if after acid sufficient to restore normal concentration has been added there is still a deficiency of total volume more water, with consequent further dilution, will be added, perhaps resulting in a second interruption of the water feed until proper concentration can again be restored by introducing acid, which however may or may not be sufficient to bring the total volume to normal; thus the latter condition is attained by a step-by-step alternation between acid and water admission in reducing increments until both factors are brought within acceptable tolerances. Likewise, while normally an increase in density of the bath is indicative of excess dissolved salt of the metal being pickled it may be due to a cooling of the liquor, and the system is designed to compensate for such density increase by deferring the bleeding of cold liquor until normal temperature has been attained whereupon if the liquor density is still excessive bleeding of some of the liquor to waste can occur. Hence after a period of shutdown, during which the liquor may cool to room temperature, the system may be set in operation without special precautions to avoid liquor waste during the preliminary heating period and as excess heating is not a problem and can readily be avoided by proper adjustment of temperature controller 25 no interlocking connections between the latter and the several other control elements save thermocouple 9 and valve 21 are required.

While we have herein described with considerable particularity one system within the purview of our invention for controlling chemical and physical factors and conditions and explained the practice of our method, we do not desire thereby to limit or confine ourselves thereto or thereby as changes and modifications in the apparatus, in the several elements comprised therein and in their relationship to each other will readily occur to those skilled in the art and may be made if desired without departing from the spirit and scope of the invention as defined in the appended claims.

Having thus described our invention, we claim and desire to protect by Letters Patent of the United States:

1. Apparatus for subjecting metal articles to a chemically active bath of substantially uniform temperature, composition and volume which comprises a tank, a conduit having connections therewith, impelling means interposed in the conduit operative to draw liquid from and return it to the tank through said conduit, a heating element proximate the conduit, means responsive to the temperature of liquid in the conduit for controlling the heating element, a branch conduit connected with the first conduit, a valve controlling said branch conduit operable to discharge liquid from the first conduit through the branch conduit, means responsive to the density of liquid in the first conduit for actuating said valve, means for supplying a liquid chemical reagent to the tank, means responsive to the electrical conductivity of liquid in the tank for controlling said reagent supply means, means for supplying water to the tank, and means responsive to the level of liquid in the tank for controlling said water supply means.

2. Apparatus as defined in claim 1 which includes means actuated by said conductivity responsive means for interrupting operation of said liquid level responsive means in accordance with predetermined conditions of conductivity of the tank liquid.

References Cited in the file of this patent

UNITED STATES PATENTS

| | | |
|---|---|---|
| 2,372,599 | Nachtman | Mar. 27, 1945 |
| 2,596,352 | Wuensch | May 13, 1952 |
| 2,769,735 | Miller | Nov. 6, 1956 |
| 2,819,726 | Rendel | Jan. 14, 1958 |
| 2,880,654 | Henry | Apr. 7, 1959 |
| 2,927,871 | Mancke et al. | Mar. 8, 1960 |